(12) United States Patent
Piret et al.

(10) Patent No.: US 6,560,291 B1
(45) Date of Patent: May 6, 2003

(54) DEVICE AND METHOD FOR TRANSMITTING INFORMATION AND DEVICE AND METHOD FOR RECEIVING INFORMATION

(75) Inventors: Philippe Piret, Cesson-Sevigne (FR); Claude Le Dantec, Saint Hilaire des Landes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,816

(22) Filed: Mar. 29, 1999

(30) Foreign Application Priority Data

Apr. 1, 1998 (FR) ............................. 98 04040

(51) Int. Cl.$^7$ .......................... H04L 27/00; H04B 7/216
(52) U.S. Cl. ........................................ 375/259; 370/342
(58) Field of Search ................................ 325/259, 354, 325/360, 130, 148, 295; 370/342, 335, 320, 321, 337

(56) References Cited

U.S. PATENT DOCUMENTS 4,888,788 A  * 12/1989 Teranishi et al. ............ 375/141
5,602,833 A    2/1997 Zehavi ........................ 370/209

FOREIGN PATENT DOCUMENTS

EP         802 648         10/1997

OTHER PUBLICATIONS

Electronics and Communications in Japan, Part I Communications, vol. 76, No. 5, May 1, 1993, pp. 54–65.

* cited by examiner

*Primary Examiner*—Chi Pham
*Assistant Examiner*—Khai Tran
(74) *Attorney, Agent, or Firm*—Fitzpatrick, Cella, Harper & Scinto

(57) ABSTRACT

A method of transmitting information on a transmission channel associated with a first numerical alphabet that takes into account a matrix n×n with an orthogonal dominant H on a second numerical alphabet including at least three different non-null values, and a set of at least one sub-matrix of the matrix H, each sub-matrix of the set containing a number p greater than or equal to 2 rows of the matrix H. A sub-matrix from the set of sub-matrixes is selected along with a p-tuple of real numbers referred to as a "row of coefficients", such that the matrix product of the row of coefficients and the selected sub-matrix supplies a sequence of numbers of the first alphabet, in order to represent the information to be transmitted. In addition to being orthogonal, matrix H is preferentially balanced.

55 Claims, 5 Drawing Sheets

DEVICE AND METHOD FOR TRANSMITTING INFORMATION AND DEVICE AND METHOD FOR RECEIVING INFORMATION

FIELD OF THE INVENTION

The present invention relates to a device and method for sending information and a device and method for receiving information.

DESCRIPTION OF THE RELATED ART

Eight-state amplitude modulation (known as "8-AM") can be described as follows. At the input to the communication channel, an alphabet $$A=\{-7, -5, -3, -1, 1, 3, 5, 7\}$$

containing eight numbers, referred to as elementary signals, is available. At each instant, r. T, with r=0, 1, 2, . . . , a multiple of an elementary period T, an information source selects a number a of the alphabet A and transmits this number a to a modulator. This modulator produces, between instants r.T and (r+1). T, the electrical signal a.cos(2.π.f.t) (or more precisely an amplitude signal proportional to a.cos(2.π.f.t)), where t is the time and f the frequency of the carrier.

To perform this modulation, the modulator uses an energy $E(a)$ substantially proportional to $a^2.T$: $E(a)=\lambda a^2.T.$, where $\lambda$ is the proportionality factor. When the alphabet is as described above, this energy will be measured by one of the numbers $\lambda$. T, 9.$\lambda$. T, 25.$\lambda$. T and 49.$\lambda$. T. The ratio between the greatest and least of these energies is 49. This number is fairly high and it would generally be preferable to reduce it. These considerations constitute the first aspect of the problem.

A second aspect of the problem will now be considered. A signal received is often corrupted, for example by noise. This means that the received signal s(t) corresponding to a transmitted signal a.cos(2.π.f.t) (a being in the alphabet A) will be measured and evaluated as corresponding to the transmission of b.cos 2.π.f.t), a formula in which b can be different from a and moreover not necessarily an element of A.

Sometimes, the noise level or the corruption, during a period T, are sufficiently high to make b.cos(2.π.f.t) closer to a*.cos(2.π.f.t) with a* in A, and a* different from a, than to any other transmittable signal, including a.cos (2.π.f.t). In this case, the decision rule is to estimate that a* has been transmitted and an estimation error appears. It can be demonstrated that, with white Gaussian additive noise conditions, the probability of such an estimation error depends highly on the quantity $(a-a^*)^2.T$, and that, the lower the said quantity, the higher will be this probability.

In particular, the probability of estimating a*=−7 when a=7 has been transmitted is very low and the probability of estimating a*=3 when a=1 has been transmitted is higher.

In this situation, there is an interest in making the error probabilities uniform: it is not a problem that very low error probabilities increase if at the same time the highest probabilities of error are considerably reduced.

From a third point of view, it will be noted that with the modulation method described above the value of a transmitted elementary signal a remains identical during a period of T seconds. Consequently, the frequency spectrum where the usable energy is transmitted is fairly narrow, which presents different disadvantages in the case of multiple transmission paths or noise dependent on the frequency. In this situation, in fact, there is interest in spreading the available energy in a frequency spectrum of greater width. in addition, in various situations, spectrum spreading is make obligatory by special regulations.

A fourth reason concerns any fading of the signal. When the quantity of energy used during an elementary period of duration T is a quantity E, not dependent on the transmitted information, it is possible to measure the corresponding received energy. In this case, if during an interval of time [r. T, (r+1).T], the received signal s(t) has an energy α.E, it is possible first of all to replace s(t) by $s^*(t)=s(t)/\sqrt{\alpha}$ and estimate the transmitted information by processing s*(t).

As a fifth reason, it is wished to have easy access to the information in receiving the noisy message. This property is referred to as an easy decoding method.

Finally, amongst the spectrum spreading properties, the following are also of interest for practical applications:

on the one hand, the error correction properties offered by the set of sequences: these properties are measured by the minimum distance (the Euclidean distance, for example) between two different sequences and it would be wished for this distance to be as great as possible (sixth reason), on the other hand, the flow of information produced by the spreading system, a flow which it would be wished to be as high as possible for a fixed correction capacity (seventh reason).

It appears that there is a close link between the minimum distance and orthogonality: if two equal energy sequences E are orthogonal, the Euclidean distance d between them is proportional to $\sqrt{2.E}$. Conjointly, requiring all the sequences of length n and of energy equal to E to be orthogonal in pairs prevents the transmission of more than $(\log_2(n))/T$ bits of information per second.

A description will now be given of the state of the art concerning these problems and the improvements to be made thereto will also be discussed.

A first way of responding to the third reason mentioned above is to select a sequence h=($h_1$, . . . , $h_n$) of length n on an alphabet $\{-1, +1\}$ and to replace the transmission of each a by A during the period T by the transmission of n letters a.$h_i$, each during a period T/n. For example, n=8 and h=(+++−+−−−), representing by the sign "+" the numerical value "+1" and by the sign "−", the numerical value "−1", a=−3 is represented by the sequence (−3, −3, −3, +3, −3, +3, +3, +3) in which each component is transmitted for a period T/8. If r =($r_1$, . . . , $r_8$), is the sequence received, after the transmission of a certain a.h, an estimation of a is the element â of A whose value is as close as possible to the mean of the $r_i.h_i$ values, i ranging from 1 to 8.

Therefore, in addition to the third reason, this method is good for the fifth reason mentioned above. However, it satisfies neither the first nor the fourth, nor the sixth, nor the seventh reasons mentioned above and it has only few qualities with regard to the second reason.

A second solution (see the document EP-A-94.400.936.4, K. Saito et al.) consists of choosing a square Hadamard matrix H of size n×n, that is to say a matrix on the alphabet $\{-1, +1\}$ which satisfies $H.H^T=n.I_n$, with $H^T$ being the transposed matrix of H and $I_n$ being the identity matrix of size n×n. Let also H* be any sub-matrix 7×n of H and let the information be represented by a sequence of 7-tuples on $\{-1, +1\}$. Also let $\underline{a}$ be such a 7-tuple and let $\underline{v}=(v_1, \ldots v_n)$ be the n-tuple on A given by $\underline{v}=\underline{a}. H^*$.

Each component $v_i$, of $\underline{v}$ is transmitted for a period T/n. For example, with n=12, $\underline{a}=[+−+−−+++]$and $$H^* = \begin{matrix} + & - & - & + & + & + & - & - & + & + & - & + \\ - & - & + & + & + & - & + & - & - & + & + \\ - & + & - & + & + & + & - & - & + & + & - \\ + & + & - & + & + & - & + & + & + & - & + & + \\ + & - & + & + & - & + & + & + & + & + & - \\ - & + & + & - & + & + & + & + & + & - & + \\ + & - & + & - & + & - & + & - & - & + & + & + \end{matrix}$$

$\underline{v}$ is equal to (1, −1, 1, −1, 1, 3, 3, −3, 1, 7, −1, −1). This method is effective vis-a-vis the first five reasons mentioned above. In particular, with regard to the first reason, the above method makes uniform the energy used over all the twelve intervals of time of duration T/12. However, this method does not lead to a good balance between the last two reasons.

BRIEF SUMMARY OF THE INVENTION

The present invention sets out to remedy these drawbacks.
In the remainder of the description:

The expression "matrix with an orthogonal dominant" designates a square matrix H of real numbers such that the absolute value of the diagonal elements of the matrix $H.H^T$ resulting from the matrix product of the matrix H and the transposed matrix $H^T$ of the matrix H, is at least an order of magnitude greater than the absolute value of the other elements of this matrix $H.H^T$, the expression "orthogonal matrix" designates a square matrix H of real numbers such that the diagonal elements of the matrix $H.H^T$ are non-null and the other elements of the matrix $H.H^T$ are null.

To this end, according to a first aspect, the present invention relates to a method of transmitting information on a transmission channel associated with a first numerical alphabet, each number in the said first alphabet being proportional to a physical quantity which can be transmitted on the said channel, characterised in that it takes into account:

a matrix with an orthogonal dominant H of dimensions n×n on a second numerical alphabet including at least three different non-null values, and a set of at least one sub-matrix of the said matrix H, each sub-matrix of the said set containing a number p greater than or equal to 2 of rows of the matrix H, and in that it includes an operation of conjoint selection of:
one of the sub-matrixes of the said set, and
a p-tuple of real numbers referred to as the "row of coefficients", in such a way that the matrix product of the said row and the said selected sub-matrix supplies a sequence of numbers of the said first alphabet, the said selected sub-matrix and the said row of coefficients conjointly representing the information to be transmitted; and an operation of representing the information to be transmitted by a said sequence.

By virtue of these provisions, when the transmission channel causes no corruption of the symbols of the first alphabet, by producing, at the output of the said transmission channel, the scalar product of the received sequence, and each of the rows of the matrix H, there is obtained:

a practically null value for each of the n-p rows which do not form part of the selected sub-matrix, and for each of the p rows forming part of the said selected sub-matrix, a value which is practically proportional to the element of the row of coefficients which corresponded to it during the conjoint selection operation, for the purpose of the matrix product.

In this way all the information is recovered on receipt of the sequence representing the transmitted information.

When the transmission channel causes corruption of the symbols of the first alphabet, by producing, at the output of the said transmission channel, the scalar product of the received sequence, and each of the rows of the matrix H, n numbers are obtained. Amongst these, on the one hand n-p numbers are obtained from the rows of the matrix H external to the sub-matrix selected on sending, and they are practically null in the absence of corruption, and, on the other hand, p numbers are obtained from the rows of the sub-matrix selected on sending and, in the absence of corruption, they are respectively practically equal to a multiple of the p numbers appearing in the row of coefficients.

When the corruption is not too great, by processing the values of the scalar products mentioned above, it is possible to recover all the transmitted information.

The advantages associated with the disclosure of the invention include:

during an elementary period of duration T, the value of the signal transmitted on the channel can vary n times, whilst the sum of the squares of these n values will be constant, the variability of the output level allows more flexibility and, all other things being equal, improves the minimum distance between signal sequences, the spectrum width is essentially multiplied by n, the matrix H being orthogonal, access to the information is easy during decoding, the minimum distance being improved, the error corruption capacity is also, for a fixed error correction capacity, the information transmission rate is improved.

These advantages correspond respectively to reasons 1, 2, 3, 5, 6 and 7 mentioned above. In particular the invention is efficacious with regard to the balance of the criteria mentioned in the last two reasons.

According to first preferential characteristics, the orthogonal dominant matrix H taken into account by the transmission method as briefly disclosed above, is an orthogonal matrix, and, during the conjoint selection operation, a sub-matrix of the said orthogonal matrix H is selected.

By virtue of these provisions, when the transmission channel causes a corruption of the symbols of the first alphabet, by effecting, at the output of the said transmission channel, the scalar product of the sequence received, and each of the rows of the matrix H, n numbers are obtained. Amongst these, on the one hand n-p numbers are obtained from the rows of the matrix H external to the sub-matrix selected on sending, and they are precisely null in the absence of corruption, and, on the other hand, p numbers are obtained from the rows of the sub-matrix selected on sending and, in the absence of corruption, they are respectively precisely equal to a multiple of the p numbers appearing in the row of coefficients.

Processing of the received sequence is therefore simplified.

According to second preferential characteristics, during the conjoint selection operation, a sub-matrix of a matrix H is selected for which the diagonal elements of the matrix $H.H^T$ resulting from the matrix product of the matrix H by the transposed matrix $H^T$ of the matrix H, are all equal to the same value M. The matrix H is then termed "balanced".

By virtue of these provisions, when the transmission channel causes a corruption of the symbols of the first alphabet, by effecting, at the output of the said transmission channel, the scalar product of the sequence received, and each of the rows of the matrix H, n numbers are obtained. Amongst these, on the one hand n-p numbers are obtained from the rows of the matrix H external to the sub-matrix selected on sending, and they are precisely null in the absence of corruption, and, on the other hand, p numbers are obtained from the rows of the sub-matrix selected on sending and, in the absence of corruption, they are respectively practically equal to M times the p numbers appearing in the row of coefficients.

According to third preferential characteristics, during the conjoint selection operation, the coefficients in the row of coefficients all have the same absolute value.

Processing of the received sequence is thus simplified.

According to other preferential characteristics, during the conjoint selection operation:
the sub-matrix of the said set, and
the p-tuple of real numbers referred to as the "row of coefficients"
are selected so that the matrix product of the said row and the said selected sub-matrix supplies a sequence of numbers of the said first alphabet, the sum of whose squares is a predetermined value.

By virtue of these provisions, the energy expended over an elementary period of duration T does not vary between two elementary periods.

According to particular characteristics:
during the conjoint selection operation, at least two sub-matrixes are able to be selected, and
during the representation operation, the choice of the sub-matrix producing the said sequence represents at least part of the information to be transmitted.

By virtue of these provisions, at the output of the transmission channel, by effecting the scalar product of the received sequence and the rows of the orthogonal matrix, a sequence of values is obtained representing the choice of the sub-matrix which was used on sending.

It is then possible, for example, to consider that the rows used are those for which the absolute values of the scalar products with the received sequence are the highest.

According to other preferential characteristics:
during the conjoint selection operation, the row of coefficients can take at least two different values, and
during the representation operation, the choice of the value of the row of coefficients represents at least part of the information to be transmitted.

By virtue of these provisions, at the output of the transmission channel, by effecting the scalar product of the received sequence and the rows of the orthogonal matrix, there is obtained a sequence of values representing elements of the row of coefficients which was selected, as well as values of the p-tuple of numbers forming the row of coefficients.

It is in fact possible, for example, to consider that the rows for the matrix H selected during the conjoint selection operation are those for which the absolute values of their scalar product with the sequence received are the highest and that the numbers in the row of coefficients are approximately proportional (by the number M appearing in the equation $H.H^T=M.I_n$) to the corresponding elements of the n-tuple obtained by producing the matrix product of the n-tuple received and the matrix $H^T$.

More generally, it is possible to consider that the coefficients used are those which are the most probable as a function of a modelling of the corruption caused by the channel.

According to a second aspect, the invention relates to a method of receiving information by means of a transmission channel associated with a first numerical alphabet, each number in the said first alphabet being proportional to a physical quantity which can be transmitted on the said channel, a method including an operation of receiving sequences of numbers, characterised in that it takes into account:
a matrix with an orthogonal dominant H of dimensions n×n on a second numerical alphabet including at least three different non-null values, and
a set of at least one sub-matrix of the said matrix H, each sub-matrix of the said set containing a number p greater than or equal to 2 of rows of the matrix H, and in that it includes:
an operation of the conjoint determination of:
one of the sub-matrixes of the said set, and
a p-tuple of real numbers referred to as the "row of coefficients",
the matrix product of the said row and the said selected sub-matrix corresponding to the said received sequence, the said selected sub-matrix and the said selected row of coefficients conjointly representing the information to be transmitted; and
an operation of conjoint matching of the said sub-matrix and the said row of coefficients with the so-called "transmitted" information.

According to a third aspect, the invention relates to a device for transmitting information on a transmission channel associated with a first numerical alphabet, each number in the said first alphabet being proportional to a physical quantity which can be transmitted on the said channel, characterised in that it has:
a memory adapted to store a set of at least one sub-matrix of a matrix with an orthogonal dominant H of dimensions n×n on a second numerical alphabet including at least three different non-null values, each sub-matrix of the said set containing a number p greater than or equal to 2 of rows of the matrix H, a means of conjoint selection of:
one of the sub-matrixes of the said set, and
a row of p coefficients equal to +1 or −1,
so that the matrix product of the said row and the said selected sub-matrix supplies a sequence of numbers of the said first alphabet, the said selected sub-matrix and the said selected row of coefficients conjointly representing the information to be transmitted; and
a means of representing the information to be transmitted by a said sequence.

According to a fourth aspect, the invention relates to a device for receiving information by means of a transmission channel associated with a first numerical alphabet, each number in the said first alphabet being proportional to a physical quantity which can be transmitted on the said channel, a device including at least one means of receiving sequences of numbers, characterised in that it has:
a memory adapted to store a set of at least one sub-matrix of a matrix with an orthogonal dominant H of dimensions n×n on a second numerical alphabet including at least three different non-null values, each sub-matrix of the said set containing a number p greater than or equal to 2 of rows of the matrix H, a means of conjoint determination of:
one of the sub-matrixes of the said set, and
a p-tuple of real numbers referred to as the "row of coefficients", the matrix product of the said row and the said selected sub-matrix corresponding to the said received sequence, the said selected sub-matrix and the said selected row of coefficients conjointly representing information to be transmitted; and a means of joint matching of the said sub-matrix and the said row of coefficients with so-called "transmitted" information.

The invention also relates to a camera, a facsimile machine, a photographic apparatus, a computer, characterised in that they have a device as briefly disclosed above.

The invention also relates to:

a means of storing information which can be read by a computer or a microprocessor storing instructions of a computer program, characterised in that it enables the method of the invention as briefly disclosed above to be implemented, and a means of storing information which can be read by a computer or a microprocessor storing data resulting from the implementation of the method as briefly disclosed above, a means, partially or totally removable, of storing information which can be read by a computer or microprocessor storing instructions of a computer program, characterised in that it enables the method of the invention as briefly disclosed above to be implemented, and a means, partially or totally removable, of storing information, which can be read by a computer or a microprocessor storing data resulting from the implementation of the method as briefly disclosed above.

The preferential or special characteristics, and the advantages of the transmission device, of the receiving device and method, of this camera, of this facsimile machine, of this photographic apparatus and of this computer and of these information storage means, being identical to those of the transmission device and method, these advantages are not restated here.

BRIEF DESCRIPTION OF THE DRAWINGS

The invention will be better understood from a reading of the following description, given with reference to the accompanying drawings in which.

DETAILED DESCRIPTION OF THE PREFERRED EMBODIMENTS

In the preferential embodiment described and depicted, there are considered:

a balanced orthogonal matrix, that is to say a matrix on an alphabet of any real numbers which satisfies $H.H^T = M.I_n$ with $H^T$ the transposed matrix of H, $I_n$ the identity matrix of dimension n×n, and M a strictly positive real number, and coefficients of a row of coefficients whose absolute values are all equal to 1.

However, the invention applies equally well to matrixes with an orthogonal dominant, to non-balanced orthogonal matrixes and to coefficients having different absolute values.

Figure 1:
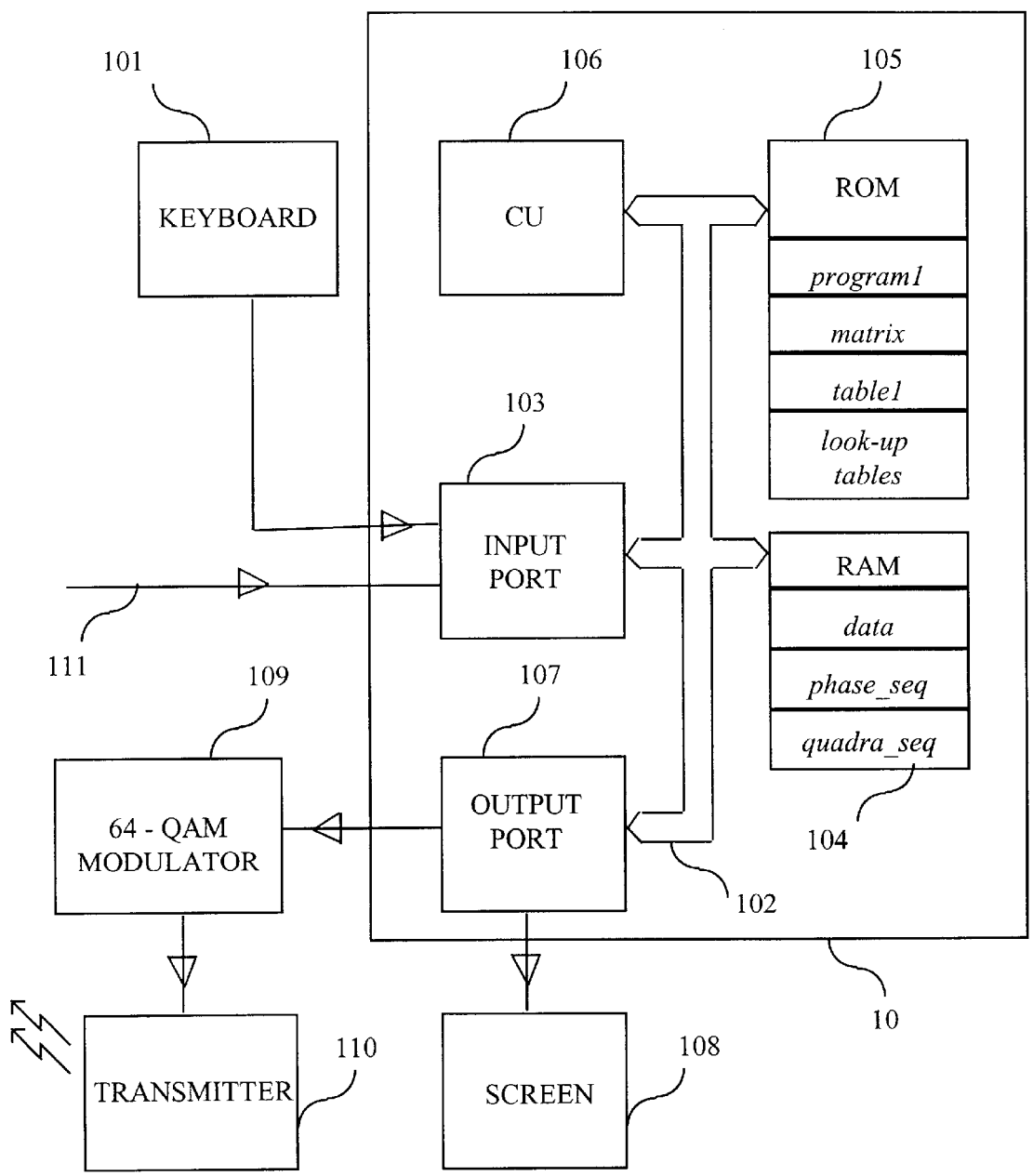
FIG. 1 depicts a coding device according to the present invention.

Before beginning the description of the coding device illustrated in FIG. 1, it is essential to disclose the theoretical bases which guarantee the quality of functioning of this device.

The embodiment of the present invention, which is described below, uses orthogonal matrixes H, always assumed to be non-singular, of dimensions n×n, on the real numbers, which are "balanced".

It is known that such matrixes exist for all dimensions, if no constraint is placed on the values of their elements. The present problem concerns the construction of orthogonal matrixes on an alphabet of integer numbers such that certain combinations of their rows using as a coefficient the numbers +1 et −1 all have their components in predetermined alphabet, such as, for example, the alphabet A corresponding to the modulation 8-AM. Such orthogonal matrixes can be constructed from square matrixes written with indeterminates, for example W, X, Y and Z and which are orthogonal whatever the real but not all null numerical values attributed to these indeterminates.

For example the matrix:

$$H_0 = \begin{matrix} W & X & Y & Z \\ -X & W & -Z & Y \\ -Y & Z & W & -X \\ -Z & -Y & X & W \end{matrix}$$

satisfies the condition $H_0.H_0^T = (W^2+X^2+Y^2+Z^2) I_4$ whatever the values taken by the four indeterminates W, X, Y and Z. If at least one of the values taken by these indeterminates is non-null, this last equation means that the rows of $H_0$ are formally orthogonal. For example the choice W=−7, X=−3, Y=1 and Z=5, gives:

$$H_0^* = \begin{matrix} -7 & -3 & 1 & 5 \\ 3 & -7 & -5 & 1 \\ -1 & 5 & -7 & 3 \\ -5 & -1 & -3 & -7 \end{matrix}$$

If now $H_{00}$ is defined by $$H_{00} = \begin{matrix} H_0 & H_0 \\ H_0 & -H_0 \end{matrix}$$

$H_{00}.H_{00}^T = 2(W^2+X^2+Y^2+Z^2) I_8$ obtained, which shows that $H_{00}$ is also formally orthogonal. (It will be observed that this equation shows how to double the number of rows and the number of columns in an orthogonal or formally orthogonal matrix whilst preserving the said orthogonal property).

For a better knowledge of the theory of formally orthogonal matrixes, the reader can refer to:

the article by J. Seberry and M. Yamada "*Hadamard matrixes, sequences and block designs*" drawn from the book "*Contemporary design theory*" published by J. H. Dimitz and D. R. Stinson, J. Wiley, in New York in 1992, or the book "*Orthogonal Designs, quadratic forms and Hadamard matrixes*", the authors of which are A. V. Geramita and J. Seberry, published M. Dekker, New York, 1979.

Let the formally orthogonal matrix H of dimensions 12×12 in which a, b, c and d are indeterminates, be as follows:

$$H = \begin{pmatrix} a & b & c & -b & a & d & -c & -d & a & -d & c & -b \\ c & a & b & a & d & -b & -d & a & -c & c & -b & -d \\ b & c & a & d & -b & a & a & -c & -d & -b & -d & c \\ b & -a & -d & a & b & c & -d & -b & c & c & -a & d \\ -a & -d & b & c & a & b & -b & c & -d & -a & d & c \\ -d & b & -a & b & c & a & c & -d & -b & d & c & -a \\ c & d & -a & d & b & -c & a & b & c & -b & d & a \\ d & -a & c & b & -c & d & c & a & b & d & a & -b \\ -a & c & d & -c & d & b & b & c & a & a & -b & d \\ d & -c & b & -c & a & -d & b & -d & -a & a & b & c \\ -c & b & d & a & -d & -c & -d & -a & b & c & a & b \\ b & d & -c & -d & -c & a & -a & b & -d & b & c & a \end{pmatrix}$$

For any real value of a, b, c and d, H therefore satisfies:

$$H.H^T = 3(a^2+b^2+c^2+d^2).I_{12}.$$

In particular, H is singular if and only if a=b=c=d=0. Let the values a=d=−1, b=c=3 be chosen now, in order to produce $$H_1 = \begin{pmatrix} -1 & 3 & 3 & -3 & -1 & -1 & -3 & 1 & -1 & 1 & 3 & -3 \\ 3 & -1 & 3 & -1 & -1 & -3 & 1 & -1 & -3 & 3 & -3 & 1 \\ 3 & 3 & -1 & -1 & -3 & -1 & -1 & -3 & 1 & -3 & 1 & 3 \\ 3 & 1 & 1 & -1 & 3 & 3 & 1 & -3 & 3 & 3 & 1 & -1 \\ 1 & 1 & 3 & 3 & -1 & 3 & -3 & 3 & 1 & 1 & -1 & 3 \\ 1 & 3 & 1 & 3 & 3 & -1 & 3 & 1 & -3 & -1 & 3 & 1 \\ 3 & -1 & 1 & -1 & 3 & -3 & -1 & 3 & 3 & -3 & -1 & -1 \\ -1 & 1 & 3 & 3 & -3 & -1 & 3 & -1 & 3 & -1 & -1 & -3 \\ 1 & 3 & -1 & -3 & -1 & 3 & 3 & 3 & -1 & -1 & -3 & -1 \\ -1 & -3 & 3 & -3 & -1 & 1 & 3 & 1 & 1 & -1 & 3 & 3 \\ -3 & 3 & -1 & -1 & 1 & -3 & 1 & 1 & 3 & 3 & -1 & 3 \\ 3 & -1 & -3 & 1 & -3 & -1 & 1 & 3 & 1 & 3 & 3 & -1 \end{pmatrix} \quad (1)$$

This matrix is therefore a nonsingular 12×12 matrix on the alphabet $A_4$: {−3, −1, 1, 3} satisfying $H_1.H_1^T = 60.I_{12}$. This implies that any pair 12-tuples u and v, with u differing from v, also satisfies $u.H_1$ different from $v.H_1$.

Let now the matrix of the first three rows of $H_1$ be termed $H_2$:

$$H_2 = \begin{pmatrix} -1 & 3 & 3 & -3 & -1 & -1 & -3 & 1 & -1 & 1 & 3 & -3 \\ 3 & -1 & 3 & -1 & -1 & -3 & 1 & -1 & -3 & 3 & -3 & 1 \\ 3 & 3 & -1 & -1 & -3 & -1 & -1 & -3 & 1 & -3 & 1 & 3 \end{pmatrix} \quad (2)$$

This matrix $H_2$ has the remarkable property of containing, in each column, at most two elements with an absolute value equal to 3. Consequently, for each triplet $\underline{a} = (a_1 a_2 a_3)$, on {−1, 1}, the elements of $\underline{a}.H_2$ are in A={−7, −5, −3, −1, 1, 3, 5, 7}.

Let there now be such a triplet a representing an item of information which is coded $\underline{v} = \underline{a}.H_2$, with $\underline{v} = (v_1, \ldots, v_{12})$ received as $\underline{r} = \underline{v} + \underline{e}$, with $\underline{e} = (e_1, \ldots, e_{12})$ the 12-tuple of errors.

In order to estimate $\underline{a}$ knowing $\underline{r}$, it is sufficient to calculate $\underline{r}.H_2^T$ with $H_2$ given by (2).

In fact, this gives:

$$\underline{r}.H_2^T = 60\ [a_1 a_2 a_3] + \underline{e}.H_2^T \quad (3)$$

Thus a reasonable evaluation of a consists of taking the signatures or signs of the elements of $\underline{r}.H_2^T$.

Another sub-matrix of $H_1$ will now be considered, having this time four rows and formed by the second, third, fifth and sixth rows of $H_1$:

$$H_3 = \begin{pmatrix} 3 & -1 & 3 & -1 & -1 & -3 & 1 & -1 & -3 & 3 & -3 & 1 \\ 3 & 3 & -1 & -1 & -3 & -1 & -1 & -3 & 1 & -3 & 1 & 3 \\ 1 & 1 & 3 & 3 & -1 & 3 & -3 & 3 & 1 & 1 & -1 & 3 \\ 1 & 3 & 1 & 3 & 3 & -1 & 3 & 1 & -3 & -1 & 3 & 1 \end{pmatrix} \quad (4)$$

Once again, this matrix $H_3$ contains no column having more than two elements with an absolute value equal to 3. If $\underline{B}$ is defined as being the set of all the 4-tuples on {−1, 0, 1} with exactly a single element equal to 0, it can easily be seen that this set contains exactly $2^5$, that is to say 32 4-tuples

| | | | |
|---|---|---|---|
| + + + 0 | + + 0 + | + 0 + + | 0 + + + |
| + + − 0 | + + 0 − | + 0 + − | 0 + + − |
| + − + 0 | + − 0 + | + 0 − + | 0 + − + |
| + − − 0 | + − 0 − | + 0 − − | 0 + − − |
| − + + 0 | − + 0 + | − 0 + + | 0 − + + |
| − + − 0 | − + 0 − | − 0 + − | 0 − + − |
| − − + 0 | − − 0 + | − 0 − + | 0 − − + |
| − − − 0 | − − 0 − | − 0 − − | 0 − − − | representing the value +1 by "+" and the value −1 by "−".

The coding of an item of information then consists of representing it by a series of quadruplets $\underline{b}$ of the said $\underline{B}$ and transmitting the series of 12-tuples $\underline{b}.H_3$ which corresponds to it.

In an equivalent fashion, the coding of an item of information consists of representing it by a pair (I, $\underline{a}$), where I is an integer between 0 and 3 which refers to one of the triplets of rows of $H_3$ and where $\underline{a}$ is a triplet on an alphabet {−1, +1}, For example, the following correspondence can be chosen I=0 corresponds to the triplet of rows 1, 2, 3,
I=1 corresponds to the triplet of rows 1, 2, 4,
I=2 corresponds to the triplet of rows 1, 3, 4, and
I=3 corresponds to the triplet of rows 2, 3, 4.

As for the triplet $\underline{a}$, it specifies the one of the linear combinations amongst 8, of the rows of the preselected sub-matrix of $H_8$ which will be transmitted.

With this representation, for example, the quadruplet (+, −, 0,−) is represented by the pair I=1 and $\underline{a}$=(+, −, −) where I specifies rows 1, 2 and 4 in the matrix $H_3$, assigned the coefficients specified by $\underline{a}$.

On reception, the sequence $\underline{r} = \underline{v} + \underline{e}$ ($\underline{e}$ being the noise 12-tuple) is used in order to calculate:

$$\underline{r}.H_3^T = 60\ [b_2 b_3 b_5 b_6] + \underline{e}.H_3^T \quad (5)$$

In order to evaluate $\underline{b}$, it is considered that the element of $\underline{b}$ which is equal to 0 is the one, amongst $b_2$, $b_3$, $b_5$ and $b_6$, which corresponds to the component of $\underline{r}.H_3^T$ whose absolute value is the lowest and the other three components are evaluated as being the signatures of the corresponding components of $\underline{r}.H_3^T$.

More generally, all the sub-matrixes $\underline{H}$ of $H_1$ having three rows and 12 columns and in which no column has more than two elements equal to 3, will be considered. It appears that 68 such sub-matrixes have this property. The triplets of rows of $H_1$ corresponding to these sub-matrixes are given in Table 1, where the triplet (X, Y, Z) refers to the triplet of rows of $H_1$ having respectively X, Y and Z as an index. Here is this Table 1:

| | | | | | | | | | | | |
|---|---|---|---|---|---|---|---|---|---|---|---|
| 1 | 2 | 3 | 1 | 7 | 8 | 3 | 5 | 6 | 5 | 6 | 12 |
| 1 | 2 | 4 | 1 | 7 | 9 | 3 | 7 | 10 | 5 | 7 | 8 |
| 1 | 2 | 7 | 1 | 7 | 10 | 3 | 8 | 9 | 5 | 7 | 10 |
| 1 | 2 | 11 | 1 | 7 | 11 | 3 | 10 | 12 | 5 | 11 | 12 |
| 1 | 3 | 4 | 1 | 7 | 12 | 4 | 5 | 6 | 6 | 7 | 9 |
| 1 | 3 | 7 | 1 | 11 | 12 | 4 | 5 | 8 | 6 | 7 | 10 |
| 1 | 3 | 12 | 2 | 3 | 5 | 4 | 5 | 10 | 6 | 11 | 12 |
| 1 | 4 | 5 | 2 | 3 | 6 | 4 | 6 | 9 | 7 | 8 | 9 |
| 1 | 4 | 6 | 2 | 3 | 8 | 4 | 6 | 10 | 7 | 8 | 10 |
| 1 | 4 | 7 | 2 | 3 | 9 | 4 | 7 | 10 | 7 | 9 | 10 |
| 1 | 4 | 8 | 2 | 3 | 10 | 4 | 8 | 9 | 7 | 10 | 11 |
| 1 | 4 | 9 | 2 | 4 | 10 | 4 | 8 | 10 | 7 | 10 | 12 |
| 1 | 4 | 10 | 2 | 5 | 6 | 4 | 9 | 10 | 8 | 9 | 11 |
| 1 | 4 | 11 | 2 | 7 | 10 | 4 | 10 | 11 | 8 | 9 | 12 |
| 1 | 4 | 12 | 2 | 8 | 9 | 4 | 10 | 12 | 8 | 11 | 12 |
| 1 | 5 | 7 | 2 | 10 | 11 | 5 | 6 | 7 | 9 | 11 | 12 |
| 1 | 6 | 7 | 3 | 4 | 10 | 5 | 6 | 11 | 10 | 11 | 12 |

In this list of 68 triplets, it has been chosen for example to eliminate the triplets (1 2 3), (4 5 6), (7 8 9) and (10 11 12). The 64 other triplets define 64 sub-matrixes $\underline{H}_{(x,y,z)}$ of three rows of respective indices X, Y and Z in the matrix $H_1$. Eight different 12-tuples $\underline{v}$ then correspond to each of the 64 sub-matrixes. It is these eight 12-tuples $\underline{v}$ given by $\underline{v}=\underline{a}$. $\underline{H}_{(X, Y, Z)}$, $\underline{a}$ being any triplet on $\{-1, 1\}$.

The encoding of an item of information consists once again of representing it by a pair (I, $\underline{a}$), I being an integer between 0 and 63 inclusive, relating to one of the 64 triplets (X, Y, Z) specifying a matrix $\underline{H}_{(X, Y, Z)}$, and $\underline{a}$ specifying which linear combination, amongst 8, of the rows of the pre-selected matrix $\underline{H}_{(X, Y, Z)}$ will be transmitted.

Therefore, in total, 9 items of binary information (6 represented by I and 3 by $\underline{a}$) are transmitted on each occasion that a sequence of length 12 on the alphabet A is transmitted. This corresponds to a spectrum spread ratio of (log $8^{12}$)/(log 512)=4. It will be observed here that, with the matrix $\underline{H}_2$ given at (2), this ratio was equal to 12/1, and that, with the matrix $\underline{H}_3$ given at (4), the spectrum spread ratio is log($8^{12}$)/(log$2^5$)=36/5.

In an equivalent fashion, the information can be pre-coded in one of the 512 12-tuples b on $\{-1, 0, 1\}$, having three and only three non-null components, which are chosen in order to form one of the 64 triplets not eliminated from Table 1. The transmitted sequence $\underline{v}$ is then equal to $\underline{b}.H$ and, from the 12-tuple $\underline{r}=\underline{v}+\underline{e}$ there is calculated $\underline{s}=\underline{r}.H^T$. In order to evaluate the coded information in the element I of the pair (I, $\underline{a}$), the three components of $\underline{s}$ having the highest absolute value are measured. If the triplet does not form part of the 64 triplets in Table 1, an error is detected. If this triplet forms part of the 64 triplets remaining in Table 1, when the triplets (1, 2, 3), (4, 5, 6), (7, 8, 9) and (10, 11, 12), have been withdrawn therefrom, the estimation Î of I is the value of this triplet. In this case, the estimation âof $\underline{a}$ of is the triplet on $\{-1, 1\}$ obtained by taking the signatures of the elements of $\underline{s}$ corresponding to the triplet Î.

Generally, starting from any orthogonal matrix H, of dimensions n×n, on an alphabet A, for any sub-matrix $\underline{H}$ of H of dimensions k×n, let N($\underline{H}$) be the set of numbers appearing as elements of $\underline{a}.\underline{H}$, where a takes all the values of the said $\underline{B}$ of all the k-tuples on $\{-1, 1\}$, and let V($\underline{H}$) be the set of n-tuples $\underline{a}.\underline{H}$ produced by these $\underline{a}$.

More generally, let S={$\underline{H}_1, \ldots, \underline{H}_r$}, a set of k×n sub-matrixes $\underline{H}_i$, i=1, ..., r of $\underline{H}$ and let N(S) be the union, for i between 1 and r inclusive, of the sets N($\underline{H}_i$) and V(S), be the union, for i between 1 and r inclusive, of the sets V($\underline{H}_i$).

Thus the set S specifies a corresponding set V(S) of $r.2^k$ sequences on the alphabet N(S). This gives rise to a spread ratio SR given by:

$$SR = \log[\text{cardinal number of } (S)]/(n \log[\text{cardinal number of } N(S)])$$

A few addition examples are given below.

The matrix $H_4$ will be considered first of all, obtained by putting a=1, b=3, c=5 and d=7 in the formally orthogonal matrix H given previously:

$$H_4 = \begin{pmatrix} 1 & 3 & 5 & -3 & 1 & 7 & -5 & -7 & 1 & -7 & 5 & -3 \\ 5 & 1 & 3 & 1 & 7 & -3 & -7 & 1 & -5 & 5 & -3 & -7 \\ 3 & 5 & 1 & 7 & -3 & 1 & 1 & -5 & -7 & -3 & -7 & 5 \\ 3 & -1 & -7 & 1 & 3 & 5 & -7 & -3 & 5 & 5 & -1 & 7 \\ -1 & -7 & 3 & 5 & 1 & 3 & -3 & 5 & -7 & -1 & 7 & 5 \\ -7 & 3 & -1 & 3 & 5 & 1 & 5 & -7 & -3 & 7 & 5 & -1 \\ 5 & 7 & -1 & 7 & 3 & -5 & 1 & 3 & 5 & -3 & 7 & 1 \\ 7 & -1 & 5 & 3 & -5 & 7 & 5 & 1 & 3 & 7 & 1 & -3 \\ -1 & 5 & 7 & -5 & 7 & 3 & 3 & 5 & 1 & 1 & -3 & 7 \\ 7 & -5 & 3 & -5 & 1 & -7 & 3 & -7 & -1 & 1 & 3 & 5 \\ -5 & 3 & 7 & 1 & -7 & -5 & -7 & -1 & 3 & 5 & 1 & 3 \\ 3 & 7 & -5 & -7 & -5 & 1 & -1 & 3 & -7 & 3 & 5 & 1 \end{pmatrix} \quad (6)$$

and let the 66 sub-matrixes including two rows of $H_4$ be hereafter denoted by $\underline{H}_i$, with i=1, ..., 66. With S={, $\underline{H}_1, \ldots, \underline{H}_{66}$}, V(S) contains 4×66=264 different 12-tuples on the alphabet N(S)={−14, −12, ..., −2, 0, 2, ..., 12, 14} whose cardinal number is 15. Since 264 is greater than 256, it is possible to select 256=$2^8$ of these 12-tuples, in order to transmit 8 information bits in the form of 256 sequences of length 12 on the alphabet N(S). After receipt, the decoding of information can be effected by the same method as the one described during the generalisation following equation (5) above, except that the triplets are now replaced by pairs.

The orthogonal matrix $H_5$ obtained by putting a=1, b=1, c=3 and d=5 in the formally orthogonal matrix H given previously will now be considered:

$$H_5 = \begin{pmatrix} 1 & 1 & 3 & -1 & 1 & 5 & -3 & -5 & 1 & -5 & 3 & -1 \\ 3 & 1 & 1 & 1 & 5 & -1 & -5 & 1 & -3 & 3 & -1 & -5 \\ 1 & 3 & 1 & 5 & -1 & 1 & 1 & -3 & -5 & -1 & -5 & 3 \\ 1 & -1 & -5 & 1 & 1 & 3 & -5 & -1 & 3 & 3 & -1 & 5 \\ -1 & -5 & 1 & 3 & 1 & 1 & -1 & 3 & -5 & -1 & 5 & 3 \\ -5 & 1 & -1 & 1 & 3 & 1 & 3 & -5 & -1 & 5 & 3 & -1 \\ 3 & 5 & -1 & 5 & 1 & -3 & 1 & 1 & 3 & -1 & 5 & 1 \\ 5 & -1 & 3 & 1 & -3 & 5 & 3 & 1 & 1 & 5 & 1 & -1 \\ -1 & 3 & 5 & -3 & 5 & 1 & 1 & 3 & 1 & 1 & -1 & 5 \\ 5 & -3 & 1 & -3 & 1 & -5 & 1 & -5 & -1 & 1 & 1 & 3 \\ -3 & 1 & 5 & 1 & -5 & -3 & -5 & -1 & 1 & 3 & 1 & 1 \\ 1 & 5 & -3 & -5 & -3 & 1 & -1 & 1 & -5 & 1 & 3 & 1 \end{pmatrix} \quad (7)$$

and let $\underline{I}$ be the following set of 32 triplets of rows of $H_5$:

| | | | | | | | | | | | |
|---|---|---|---|---|---|---|---|---|---|---|---|
| 1 | 2 | 3 | 1 | 7 | 9 | 3 | 6 | 11 | 4 | 10 | 12 |
| 1 | 2 | 5 | 2 | 3 | 6 | 3 | 8 | 9 | 5 | 6 | 11 |
| 1 | 2 | 7 | 2 | 3 | 8 | 3 | 8 | 11 | 5 | 8 | 9 |
| 1 | 2 | 12 | 2 | 5 | 6 | 3 | 10 | 11 | 5 | 8 | 11 |
| 1 | 3 | 4 | 2 | 5 | 8 | 4 | 5 | 6 | 5 | 10 | 11 |
| 1 | 3 | 11 | 2 | 10 | 12 | 4 | 5 | 8 | 6 | 7 | 9 |

-continued

| 1 | 4 | 5  | 3 | 4 | 6 | 4 | 6 | 7  | 7  | 8  | 9  |
|---|---|----|---|---|---|---|---|----|----|----|----|
| 1 | 5 | 11 | 3 | 4 | 8 | 4 | 6 | 12 | 10 | 11 | 12 |

(8)

For each triplet I=($i_1 i_2 i_3$), let $\underline{H}_I$ be the sub-matrix of size 3×12 of $H_5$ which contains three rows of $H_5$ whose numbers are given by $i_1$, $i_2$ and $i_3$. For each triplet I in $\underline{I}$ and each triplet $\underline{a}$ on the alphabet $\{-1, 1\}$, the 12-tuple a.$H_I$ has all its components in $\{-9, -7, -5, -3, -1, 1, 3, 5, 7, 9\}$, a set of cardinal numbers equal to 10, which means that it is suited to the amplitude modulation method with ten values of components, 10-AM. This shows the flexibility of the method of the invention. There is then a set of 32×8=256 sequences of length 12 modulated in 10-AM which can be decoded by the method equation (5) above.

The different spreading systems described in this section and matrixes $H_1$, $H_4$ et $H_5$, given respectively by (1), (6) and (7), are very effective since they provide a good compromise between resistance to noise, the information flow rate and compatibility with a predetermined modulation mehtod.

The scope of the invention described above can extend to m-state phase quadrature amplitude modulation, commonly referred to as "m-QAM". For this purpose, two modulation methods detailed above are used, preferably identical, on the one hand, for the in-phase modulation component m-QAM and on the ohter hand for the component in phase quadrature. This is based on the observation that an m-QAM signal can be considered to be the sum of two AM signals in phase quadrature.

As another generalisation, the matrix $H_5$ given by (7) will be considered once again, but now requiring that the natural alphabet associated with the transmission channel be A=$\{-7, -5, -3, -1, 1, 3, 5, 7\}$ of cardinal number 8, and not the 10-letter alphabet presented above. Naturally this entails additional restrictions on the triplets I which can be used. To illustrate this approach, I=$\{1\ 2\ 3\}$ and the corresponding matrix will be chosen:

$$H_I = \begin{matrix} 1 & 1 & 3 & -1 & 1 & 5 & -3 & -5 & 1 & -5 & 3 & -1 \\ 3 & 1 & 1 & 1 & 5 & -1 & -5 & 1 & -3 & 3 & -1 & -5 \\ 1 & 3 & 1 & 5 & -1 & 1 & 1 & -3 & -5 & -1 & -5 & 3 \end{matrix}$$

If the 8 12-tuples $\underline{a}.H_I$ are chosen with $\underline{a}$ being a triplet on $\{-1, 1\}$, it can be seen that only two amongst them, (1 1 1) and (-1 -1 -1), produce a 12-tuple $\underline{a}.H_I$ having all its components in A. By performing this calculation for all the triplets I rather than only for those whose list is given at (8), 68 pairs (I, $\underline{a}$) are obtained having the property that all the components of $\underline{a}.H_1$ are in the alphabet A. The list of these pairs (I, $\underline{a}$) is given in Table 2, below. In this Table 2, for example, the row (1, 4, 12, 1, -1, 1) represents the pair (I, $\underline{a}$), the numbers 1, 4 and 12 specifying the triplet of indices of rows and the numbers 1, -1 and 1 specifying the triplet $\underline{a}$. The 12-tuple (1 -1 1) H$\{_{1\ 4\ 12}\}$ corresponds to them, equal to:

(1 7 5 -7 -3 3 1 -3 -7 -7 7 -5).

Since 68 is greater than $2^6$=64, a total of 6 information bits can be coded by these 68 different 12-tuples. The decoding of the 12-tuples received is always the same, with respect to the previous usage of $H_5$, the efficiency of the coding is lesser and the capacity for detection and/or correction is improved.

TABLE 2

| 1 | 2 | 3  | -1 | -1 | -1 | 3  | 8  | 11 | -1 | 1  | -1 |
|---|---|----|----|----|----|----|----|----|----|----|----|
| 1 | 2 | 3  | 1  | 1  | 1  | 3  | 8  | 11 | 1  | -1 | 1  |
| 1 | 2 | 7  | -1 | -1 | -1 | 4  | 5  | 6  | -1 | -1 | -1 |
| 1 | 2 | 7  | 1  | 1  | 1  | 4  | 5  | 6  | 1  | 1  | 1  |
| 1 | 2 | 12 | -1 | 1  | -1 | 4  | 6  | 7  | -1 | -1 | -1 |
| 1 | 2 | 12 | 1  | 1  | 1  | 4  | 6  | 7  | 1  | 1  | 1  |
| 1 | 3 | 11 | -1 | 1  | 1  | 4  | 6  | 12 | -1 | -1 | 1  |
| 1 | 3 | 11 | 1  | -1 | 1  | 4  | 6  | 12 | 1  | 1  | -1 |
| 1 | 4 | 7  | -1 | -1 | -1 | 4  | 8  | 9  | -1 | -1 | 1  |
| 1 | 4 | 7  | 1  | 1  | 1  | 4  | 8  | 9  | 1  | 1  | -1 |
| 1 | 4 | 12 | -1 | 1  | -1 | 4  | 8  | 12 | -1 | -1 | 1  |
| 1 | 4 | 12 | 1  | -1 | 1  | 4  | 8  | 12 | 1  | -1 | 1  |
| 1 | 5 | 11 | -1 | 1  | 1  | 5  | 7  | 9  | -1 | 1  | -1 |
| 1 | 5 | 11 | 1  | -1 | -1 | 5  | 7  | 9  | 1  | -1 | 1  |
| 1 | 9 | 12 | -1 | 1  | -1 | 5  | 8  | 9  | -1 | 1  | 1  |
| 1 | 9 | 12 | 1  | -1 | 1  | 5  | 8  | 9  | 1  | -1 | -1 |
| 2 | 3 | 10 | -1 | 1  | -1 | 5  | 10 | 11 | -1 | -1 | 1  |
| 2 | 3 | 10 | 1  | -1 | 1  | 5  | 10 | 11 | 1  | 1  | -1 |
| 2 | 5 | 8  | -1 | 1  | 1  | 6  | 7  | 8  | -1 | -1 | 1  |
| 2 | 5 | 8  | 1  | -1 | -1 | 6  | 7  | 8  | 1  | 1  | -1 |
| 2 | 5 | 8  | -1 | -1 | 1  | 6  | 7  | 11 | -1 | 1  | 1  |
| 2 | 5 | 8  | 1  | 1  | -1 | 6  | 7  | 11 | 1  | -1 | -1 |
| 2 | 6 | 12 | -1 | 1  | 1  | 7  | 8  | 9  | -1 | -1 | 1  |
| 2 | 6 | 12 | 1  | -1 | -1 | 7  | 8  | 9  | 1  | 1  | 1  |
| 2 | 7 | 10 | -1 | -1 | 1  | 7  | 8  | 11 | -1 | -1 | 1  |
| 2 | 7 | 10 | 1  | -1 | 1  | 7  | 8  | 11 | 1  | 1  | 1  |
| 2 | 8 | 12 | -1 | -1 | 1  | 7  | 10 | 11 | -1 | 1  | 1  |
| 2 | 8 | 12 | 1  | 1  | -1 | 7  | 10 | 11 | 1  | -1 | -1 |
| 3 | 4 | 10 | -1 | 1  | 1  | 8  | 9  | 12 | -1 | -1 | 1  |
| 3 | 4 | 10 | 1  | -1 | -1 | 8  | 9  | 12 | 1  | 1  | 1  |
| 3 | 6 | 9  | -1 | -1 | -1 | 9  | 10 | 12 | -1 | 1  | 1  |
| 3 | 6 | 9  | 1  | 1  | 1  | 9  | 10 | 12 | 1  | -1 | -1 |
| 3 | 8 | 9  | -1 | 1  | 1  | 10 | 11 | 12 | -1 | -1 | 1  |
| 3 | 8 | 9  | 1  | -1 | -1 | 10 | 11 | 12 | 1  | 1  | 1  |

It will be noted that, unlike the previous ones, the latter coding method cannot be implemented by independently effecting the selection of the two elements of the pair (I, $\underline{a}$).

After the selection of I, that of $\underline{a}$ is restricted to two or four triplets only amongst the eight initial available. Amongst the 68 triplets I possible:

11 restrict the choice of $\underline{a}$ to an element of the pair $\{(-1, -1, -1), (1, 1, 1)\}$, 4 restrict the choice of a to an element of the pair $\{(-1, -1, 1), (1, 1, -1)\}$, 7 restrict the choice of a to an element of the pair $\{(-1, 1, -1), (1, -1, 1)\}$, and 10 restrict the choice of $\underline{a}$ to an element of the pair $\{(1, -1, -1), (-1, 1, 1)\}$.

Finally, there is a triplet I, namely (2, 5, 8), which restricts the choice of $\underline{a}$ to one of the 4 triplets of the set $\{(-1, 1, 1), (1, -1, -1), (-1, -1, -1), (1, 1, 1)\}$.

The choice of the elements of the pair (I, $\underline{a}$) is therefore effected during a conjoint selection operation.

In FIG. 1, the coding device is illustrated in the form of a block diagram and is depicted under the general reference 10 and has, connected to together by an address and data bus 102:

a central processing unit 106;

a random access memory RAM 104;

a read only memory ROM 105;

an input port 103 serving to receive, in the form of binary data, information which the coding device is to transmit;

an output port 107 enabling the coding device to transmit two sequences of symbols of the alphabet of the transmission channel, consisting here of a 64-state alphabet known as "64-QAM" and used by a modulator 109 effecting a quadrature amplitude modulation with 64 states representing two sequences of symbols of two code words which come from the output port 107; and, independently of the bus 102:

a transmitter 110 having an ultra-high frequency interface circuit which transposes the signal modulated by the modulator 109 to a carrier frequency and amplifies it, and a transmitting antenna which broadcasts this transposed and amplified signal;

a display screen 108 connected to the output port 107;

a keyboard 101 connected to the input port 103 and supplying octets representing keyboard keys used in succession; and an input 111 for data to be transmitted, in the form of binary data, connected to the input port 103.

Each of the elements illustrated in FIG. 1 is well known to persons skilled in the art of transmission systems and, more generally, information processing systems. These elements are therefore not described here.

It should be noted here that the word "register" used below designates, in each of the memories, both a low-capacity memory area (storing only a few binary data) and a large-capacity memory area (enabling a complete program to be stored).

The random access memory 104 stores data, variables and intermediate processing results, in memory registers bearing, in the remainder of the description, the same names as the data whose values they store. The random access memory 104 contains notably:

a register "data" in which there is stored on the one hand a series of binary data to be transmitted which comes from the input port 103, and on the other hand the selected sub-matrix and the row of coefficients which corresponds to it, a register "phase_seq" in which there is stored the sequence of symbols of the alphabet of the transmission channel which corresponds to the in-phase components, and a register "quadra_seq" in which there is stored the sequence of symbols of the alphabet of the transmission channel which corresponds to the components in phase quadrature.

The random access memory 104 constitutes a means of storing information which can be read by a computer or microprocessor. It stores data resulting from the implementation of this method, that is to say coded data.

According to a variant, the random access memory 104 is removable, partially or totally, and has for example a magnetic tape, or a diskette.

The read only memory 105 is adapted to store:

the operating program of the central processing unit 106, in a register "program 1", the formally orthogonal matrix $H_1$ in a register "matrix", Table 1 detailed above, in a register "table 1", a so-called "row" look-up table matching six binary information items received by means of the data input 111 with a triplet of row indices of the orthogonal matrix $H_1$, and a so-called "coefficient" look-up table matching three binary information items received by means of the data input 111 with a triplet of binary coefficients, in a register "look-up tables".

The read only memory 105 constitutes a means of storing information which can be read by a computer or microprocessor. It stores instructions of a computer program which makes it possible to implement the coding method which is the object of the invention.

According to a variant, the read only memory 105 is removable, partially or totally, and has for example a magnetic tape, a diskette or a compact disc with a fixed memory (CD-ROM).

As an example of a row look-up table, the table below matches a 6-tuple of binary numbers with a triplet 1 of rows of the matrix $H_1$:

| | | | | | | | | |
|---|---|---|---|---|---|---|---|---|
| 0 | 0 | 0 | 0 | 0 | 0 | 1 | 2 | 4 |
| 0 | 0 | 0 | 0 | 0 | 1 | 1 | 2 | 7 |
| 0 | 0 | 0 | 0 | 1 | 0 | 1 | 2 | 11 |
| 0 | 0 | 0 | 0 | 1 | 1 | 1 | 3 | 4 |
| 0 | 0 | 0 | 1 | 0 | 0 | 1 | 3 | 7 |
| 0 | 0 | 0 | 1 | 0 | 1 | 1 | 3 | 12 |
| 0 | 0 | 0 | 1 | 1 | 0 | 1 | 4 | 5 |
| 0 | 0 | 0 | 1 | 1 | 1 | 1 | 4 | 6 |
| 0 | 0 | 1 | 0 | 0 | 0 | 1 | 4 | 7 |
| 0 | 0 | 1 | 0 | 0 | 1 | 1 | 4 | 8 |
| 0 | 0 | 1 | 0 | 1 | 0 | 1 | 4 | 9 |
| 0 | 0 | 1 | 0 | 1 | 1 | 1 | 4 | 10 |
| 0 | 0 | 1 | 1 | 0 | 0 | 1 | 4 | 11 |
| 0 | 0 | 1 | 1 | 0 | 1 | 1 | 4 | 12 |
| 0 | 0 | 1 | 1 | 1 | 0 | 1 | 5 | 7 |
| 0 | 0 | 1 | 1 | 1 | 1 | 1 | 6 | 7 |
| 0 | 1 | 0 | 0 | 0 | 0 | 1 | 7 | 8 |
| 0 | 1 | 0 | 0 | 0 | 1 | 1 | 7 | 9 |
| 0 | 1 | 0 | 0 | 1 | 0 | 1 | 7 | 10 |
| 0 | 1 | 0 | 0 | 1 | 1 | 1 | 7 | 11 |
| 0 | 1 | 0 | 1 | 0 | 0 | 1 | 7 | 12 |
| 0 | 1 | 0 | 1 | 0 | 1 | 1 | 11 | 12 |
| 0 | 1 | 0 | 1 | 1 | 0 | 2 | 3 | 5 |
| 0 | 1 | 0 | 1 | 1 | 1 | 2 | 3 | 6 |
| 0 | 1 | 1 | 0 | 0 | 0 | 2 | 3 | 8 |
| 0 | 1 | 1 | 0 | 0 | 1 | 2 | 3 | 9 |
| 0 | 1 | 1 | 0 | 1 | 0 | 2 | 3 | 10 |
| 0 | 1 | 1 | 0 | 1 | 1 | 2 | 4 | 10 |
| 0 | 1 | 1 | 1 | 0 | 0 | 2 | 5 | 6 |
| 0 | 1 | 1 | 1 | 0 | 1 | 2 | 7 | 10 |
| 0 | 1 | 1 | 1 | 1 | 0 | 2 | 8 | 9 |
| 0 | 1 | 1 | 1 | 1 | 1 | 2 | 10 | 11 |
| 1 | 0 | 0 | 0 | 0 | 0 | 3 | 4 | 10 |
| 1 | 0 | 0 | 0 | 0 | 1 | 3 | 5 | 6 |
| 1 | 0 | 0 | 0 | 1 | 0 | 3 | 7 | 10 |
| 1 | 0 | 0 | 0 | 1 | 1 | 3 | 8 | 9 |
| 1 | 0 | 0 | 1 | 0 | 0 | 3 | 10 | 12 |
| 1 | 0 | 0 | 1 | 0 | 1 | 4 | 5 | 8 |
| 1 | 0 | 0 | 1 | 1 | 0 | 4 | 5 | 10 |
| 1 | 0 | 0 | 1 | 1 | 1 | 4 | 6 | 9 |
| 1 | 0 | 1 | 0 | 0 | 0 | 4 | 6 | 10 |
| 1 | 0 | 1 | 0 | 0 | 1 | 4 | 7 | 10 |
| 1 | 0 | 1 | 0 | 1 | 0 | 4 | 8 | 9 |
| 1 | 0 | 1 | 0 | 1 | 1 | 4 | 8 | 10 |
| 1 | 0 | 1 | 1 | 0 | 0 | 4 | 9 | 10 |
| 1 | 0 | 1 | 1 | 0 | 1 | 4 | 10 | 11 |
| 1 | 0 | 1 | 1 | 1 | 0 | 4 | 10 | 12 |
| 1 | 0 | 1 | 1 | 1 | 1 | 5 | 6 | 7 |
| 1 | 1 | 0 | 0 | 0 | 0 | 5 | 6 | 11 |
| 1 | 1 | 0 | 0 | 0 | 1 | 5 | 6 | 12 |
| 1 | 1 | 0 | 0 | 1 | 0 | 5 | 7 | 8 |
| 1 | 1 | 0 | 0 | 1 | 1 | 5 | 7 | 10 |
| 1 | 1 | 0 | 1 | 0 | 0 | 5 | 11 | 12 |
| 1 | 1 | 0 | 1 | 0 | 1 | 6 | 7 | 9 |
| 1 | 1 | 0 | 1 | 1 | 0 | 6 | 7 | 10 |
| 1 | 1 | 0 | 1 | 1 | 1 | 6 | 11 | 12 |
| 1 | 1 | 1 | 0 | 0 | 0 | 7 | 8 | 10 |
| 1 | 1 | 1 | 0 | 0 | 1 | 7 | 9 | 10 |
| 1 | 1 | 1 | 0 | 1 | 0 | 7 | 10 | 11 |
| 1 | 1 | 1 | 0 | 1 | 1 | 7 | 10 | 12 |
| 1 | 1 | 1 | 1 | 0 | 0 | 8 | 9 | 11 |
| 1 | 1 | 1 | 1 | 0 | 1 | 8 | 9 | 12 |
| 1 | 1 | 1 | 1 | 1 | 0 | 8 | 11 | 12 |

As an example of a coefficient look-up table, the following table matches a triplet of binary numbers with a triplet of coefficients:

| | | | | | |
|---|---|---|---|---|---|
| 0 0 0 | | 1 | 1 | 1 | |
| 0 0 1 | | 1 | 1 | −1 | |
| 0 1 0 | | 1 | −1 | 1 | |
| 0 1 1 | | 1 | −1 | −1 | |
| 1 0 0 | | −1 | 1 | 1 | |
| 1 0 1 | | −1 | 1 | −1 | |
| 1 1 0 | | −1 | −1 | 1 | |
| 1 1 1 | | −1 | −1 | −1 | |

Figure 2:
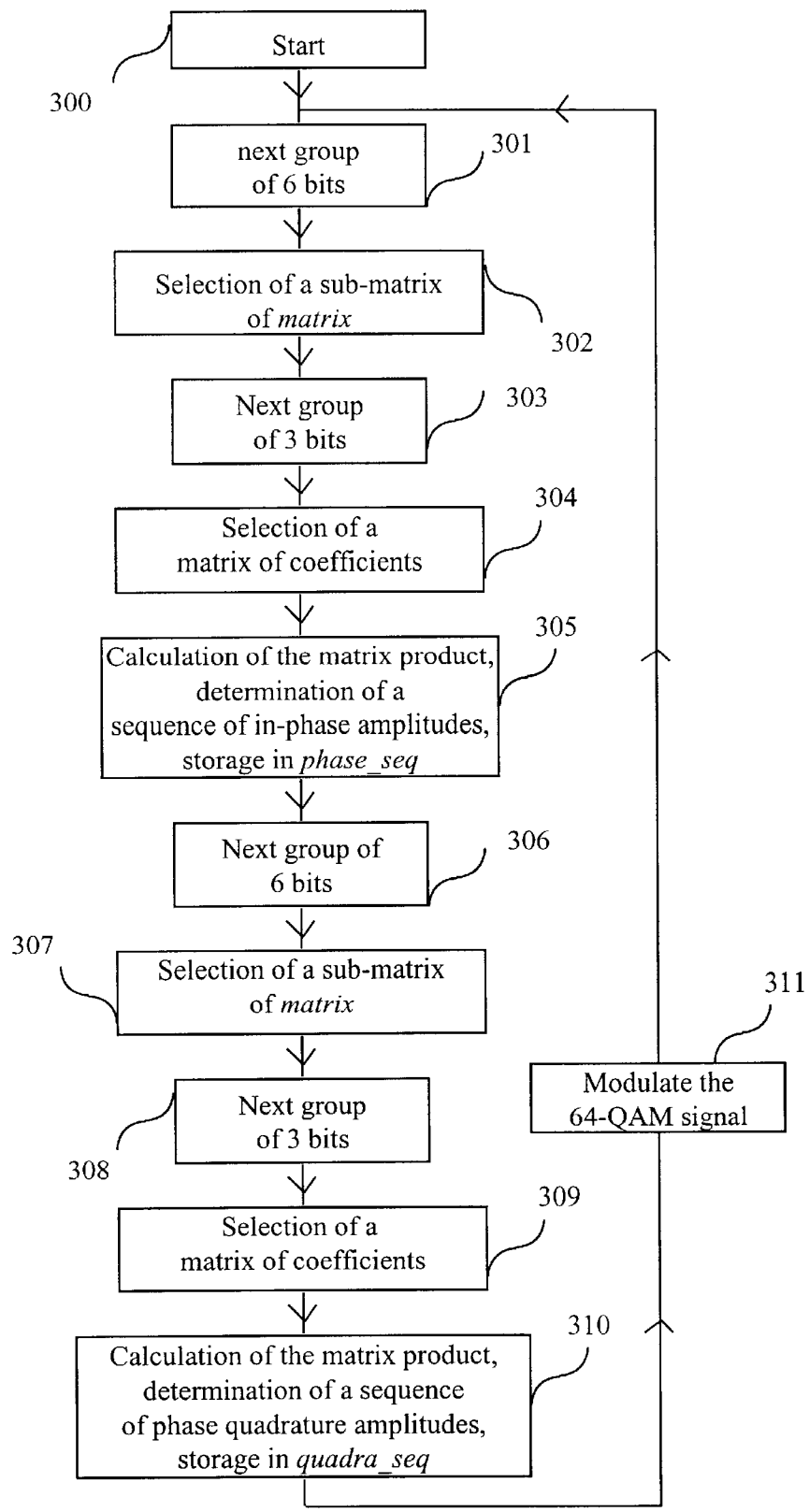
FIG. 2 depicts a flow diagram for the operation of the coding device illustrated in FIG. 1.

The central processing unit 106 is adapted to implement the flow diagram described in FIG. 2. In this FIG. 2, it will be observed that, during an operation 300, the initialisation of the transmission device illustrated in FIG. 1 is effected. Next, during an operation 301, from amongst the binary information to be transmitted, which are available at the input port 103, the central unit 106 takes a group formed by the first six binary information items to be transmitted, and puts it in the register "data" of the random access memory 104.

During an operation 302, the central unit uses the row look-up table stored in the read only memory 105 to select, in Table 1, a triplet of rows representing the six binary information items to be transmitted placed in the register "data" and puts the sub-matrix formed by the said rows in the register "data".

Then, during an operation 303, from amongst the binary information items to be transmitted, which are available at the input port 103, the central unit 106 takes a group formed by the first three binary information items to be transmitted, and puts it in the register "data" the random access memory 104.

During an operation 304, the central unit uses the coefficient look-up table, stored in the read only memory 105, to select a triplet of coefficients representing the three binary information items to be transmitted placed in the register "data". This triplet forms a row matrix with three elements, referred to as a "row of coefficients".

Next, during an operation 305, the central unit 106 effects the matrix product of the row of coefficients selected during operation 304, by the selected sub-matrix of rows and puts in the register "phase_seq" the sequence resulting from this matrix product.

Next, the operations 306 to 309 are respectively identical to the operations 301 to 304.

Next, during an operation 310, the central unit 106 effects the matrix product of the row of coefficients selected during the operation 309 and the sub-matrix of rows selected during the operation 307, and puts in the register "quadra_seq" the sequence resulting from this matrix product.

Finally, during an operation 311, the central unit 106 makes the modulator 109 successively transmit, by means of the output port 107, each pair formed by one of the elements of the sequence stored in the register "phase_seq" and one of the elements in the sequence stored in the register "quadra_seq", following their order in these sequences. Then the operation 301 is reiterated.

The decoding performed in accordance with the invention will now be disclosed, which is particularly suited here to a channel close to a theoretical additive white gaussian noise channel, better known by the initials AWGN.

The decoding device depicted in FIG. 4, under the general reference 20, is illustrated in the form of a block diagram. It has, connected together by an address and data bus 202:

a central processing unit 206
a random access memory RAM 204;
a read only memory ROM 205;
an input port 203 serving to receive information which the decoding device is to process, store or transmit;
an output port 207 enabling the decoding device to transmit sequences of decoded binary information; and, independently of the bus 202:
a receiver 209 having a receiving antenna which receives a signal representing the signal transmitted by the transmitting antenna 110 of a coding device, and an ultra-high frequency interface circuit which effects an automatic gain control and a transposition of a basic band of the signal received;
a demodulator 210, connected to the input port 203, effecting a demodulation, in the form of two sequences of symbols of A(8), representing sequences of symbols received by the antenna 209 and previously modulated by 64-state quadrature amplitude modulation, by the device illustrated in FIG. 1;
a display screen 208 connected to the output port 207; and
a keyboard 201 connected to the input port 203.

Figure 3:
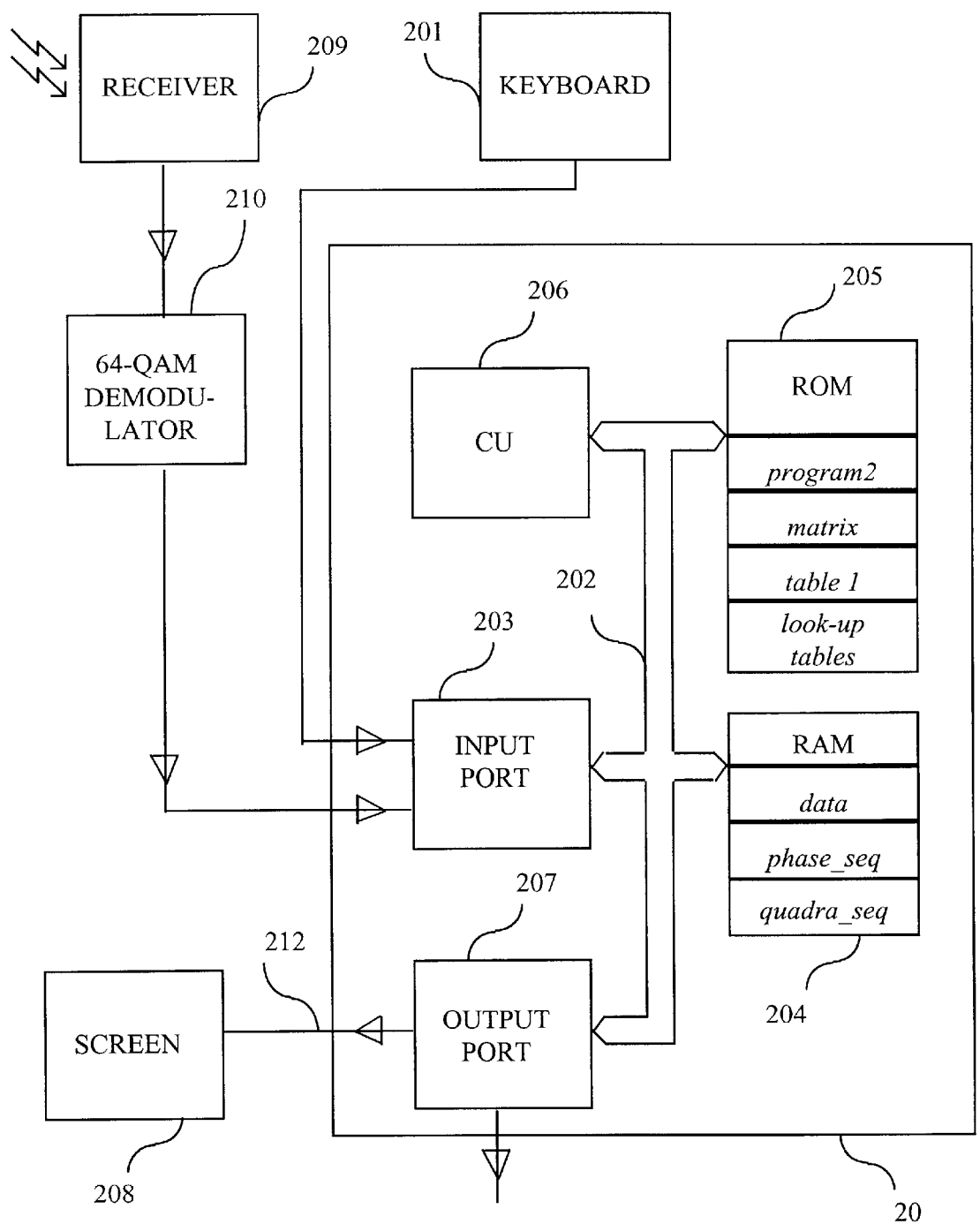
FIG. 3 depicts a decoding device according to the present invention.

Each of the elements illustrated in FIG. 3 is well known to persons skilled in the art of information decoding systems and more generally information processing systems. These elements are therefore not described here.

The random access memory 204 stores data, variables and intermediate processing results, in memory registers bearing, in the remainder of the description, the same names as the data whose values they store. The random access memory 204 contains notably:

a register "data" in which there is stored a series of decoded binary data, a series which is intended to be put on the output port 207,
a register "phase_seq" in which there is stored the sequence of symbols received which corresponds to the in-phase components, and
a register "quadra_seq" in which there is stored the sequence of symbols received which corresponds to the components in phase quadrature.

It will be noted here that, depending on whether a hard or soft decoding is carried out, the sequences of symbols received are respectively estimated in numbers of the alphabet of the transmission channel or in numbers which can take a greater diversity of values.

The read only memory 205 is adapted to store:
the operating program of the central processing unit 206, in a register "program 2",
the formally orthogonal matrix $H_1$ in a register "matrix", Table 1 detailed above, in a register "table 1",
a look-up table matching a triplet of indices of rows of the orthogonal matrix $H_1$ with six decoded binary information items, and a look-up table matching a triplet of binary coefficients with three decoded binary information items, in a register "look-up tables".

The read only memory 205 constitutes a means of storing information which can be read by a computer or microprocessor. It stores instructions of a computer program which makes it possible to implement the decoding method which is the object of the invention.

According to a variant, the read only memory 205 is removable, partially or totally, and has for example a magnetic tape, a diskette or a compact disc with fixed memory (CD-ROM).

Figure 4A:
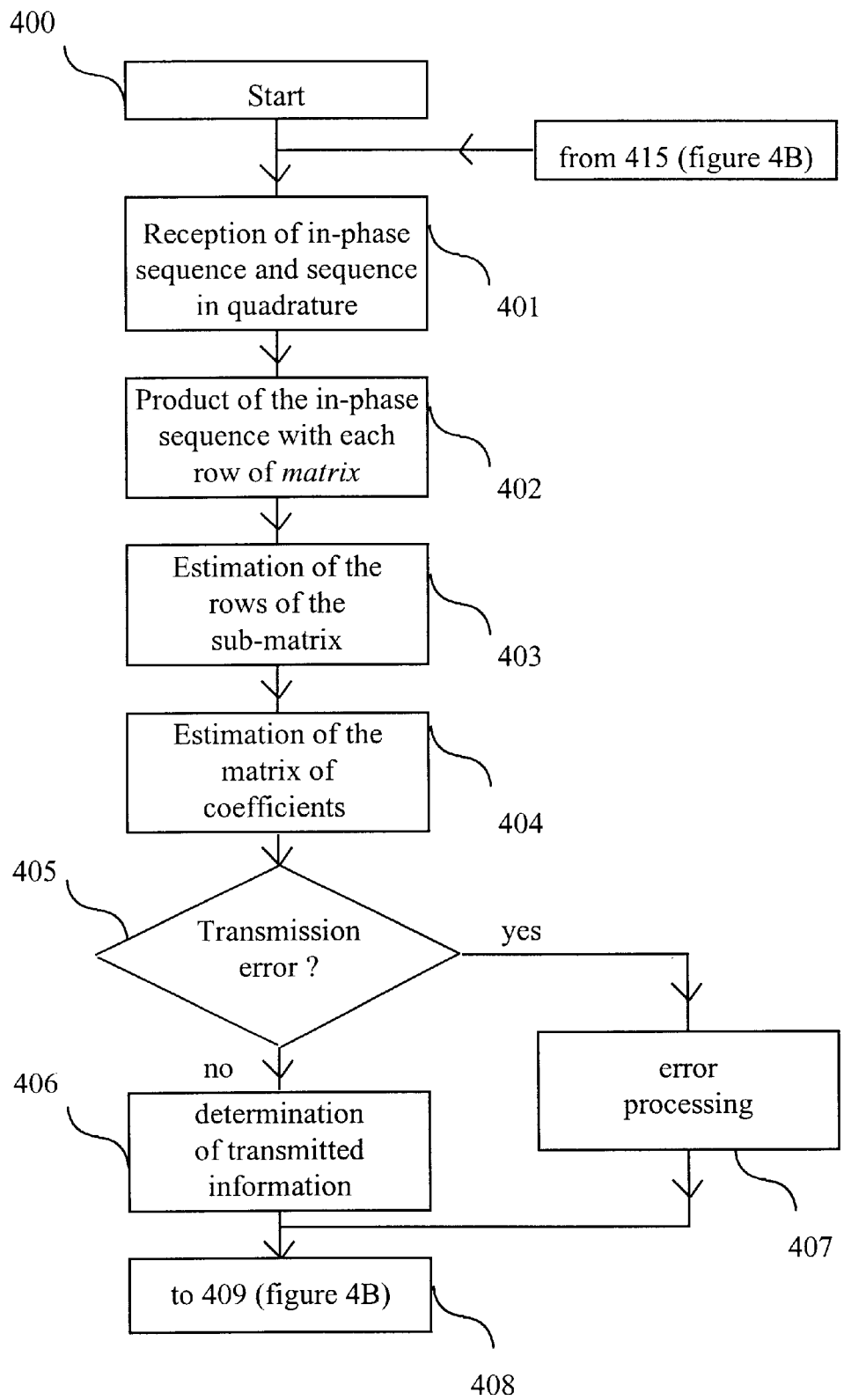
FIGS. 4A and 4B depict a flow diagram for the operation of the decoding device illustrated in FIG. 3.
Figure 4B:
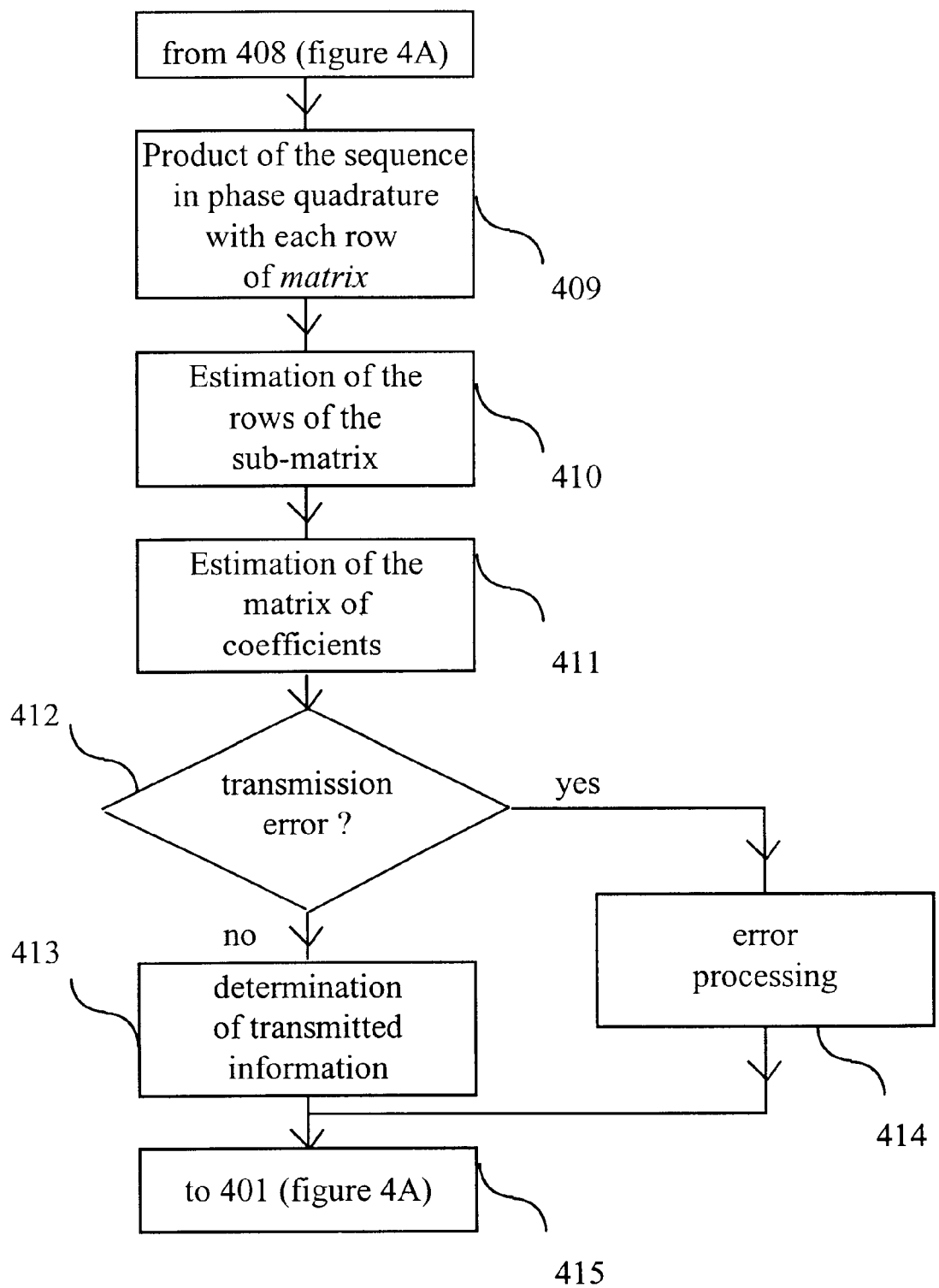

The central processing unit 206 is adapted to implement the flow diagram described in FIGS. 4A and 4B. In FIG. 4A it can be seen that, during the operation 400, the receiving device illustrated in FIG. 3 is initialised.

Then, during an operation 401, a sequence of twelve pairs of numerical values each corresponding successively to the two components (phase and phase quadrature) of a signal demodulated by the demodulator 210, is put in the form of two sequences corresponding respectively to the twelve successive in phase components and to the twelve successive components in phase quadrature, in the registers "phase_seq" and "quadra_seq" of the random access memory 204.

Next, during an operation 402, the central unit 206 effects the scalar product of the row consisting of the sequence stored in the register "phase_seq" and each of the rows of the matrix $H_1$ stored in the register "matrix". During an operation 403, the central unit 206 estimates the three rows of the sub-matrix used by the transmission device as being the three rows which present, at the end of the operation 402, the highest scalar products in absolute values.

During an operation 404, the central unit 206 estimates the value of each of the coefficients of the row of coefficients as being equal to the signature of the scalar product obtained for the row of the sub-matrix under consideration, during the operation 402. It should be stated here that the signature takes a value "+1" when the scalar product is positive and the value "−1" when the scalar product is negative.

During the operation 405, the central unit 206 determines whether or not the triplet of indices of rows of the matrix $H_1$ determined during the operation 403 is a triplet absent from Table 1. When the result of the test 405 is positive, that is to say when the triplet of indices of rows is absent from Table 1, an operation 404 of transmission error processing is performed.

In addition, during the operation 405, it is possible to detect errors by any means known to persons skilled in the art, in particular if the scalar products are too small to give a reliable result or too close together to be validly processed.

The operation 407 consists of processing the errors detected according to known techniques.

When the result of the test 405 is negative, during an operation 406, the central unit 206 determines the binary information transmitted using the row and coefficient look-up tables stored in the register "look-up table" and puts this binary information in the register "data" of the random access memory 204.

The operations 409 to 415, FIG. 4B, act respectively on the sequence corresponding to the components in phase quadrature, in the same way as the operations 402 to 408 act on the sequence corresponding to the phase components.

Then the operation 401 is reiterated.

What is claimed is:

1. Method of transmitting information on a transmission channel associated with a first numerical alphabet, each number in the first alphabet being proportional to a physical quantity to be transmitted on the channel, the method comprising:

conjointly selecting a sub-matrix and a row of coefficients, wherein the sub-matrix is selected from a set of at least one sub-matrix of a matrix with an orthogonal dominant H of dimensions n×n on a second numerical alphabet including at least three different non-null values, wherein each of the at least one sub-matrix of the set contains a number p greater than or equal to 2 of rows of the matrix of H, and wherein the row of coefficients comprises a p-tuple of real numbers, wherein a matrix product of the row of coefficients and the selected sub-matrix supplies a sequence of numbers of the first alphabet, and wherein the selected sub-matrix and the row of coefficients conjointly represents the information to be transmitted; and representing the supplied sequence of numbers by means of a physical quantity to be transmitted.

2. Information transmission method according to claim 1, wherein the matrix H is an orthogonal matrix, and wherein, during said conjoint selection step, a sub-matrix of the orthogonal matrix H is selected.

3. Information transmission method according to either one of claims 1 or 2, wherein, during said conjoint selection step, the sub-matrix of the matrix H is selected, for which diagonal elements of a matrix $H.H^T$ resulting from a matrix product of the matrix H and transposed matrix $H^T$ of the matrix H, are all equal to a same value M.

4. Information transmission method according to claim 3, wherein, during said conjoint selection step, coefficients of the row of coefficients all have a same absolute value.

5. Information transmission method according to claim 4, wherein, during said conjoint selection step, the sub-matrix of the set, and the p-tuple of real numbers referred to as the row of coefficients are selected so that a matrix product of the row of coefficients and the selected sub-matrix supplies a sequence of numbers of the first alphabet, a sum of whose squares is a predetermined value.

6. Information transmission method according to claim 5, wherein, during said conjoint selection step, at least two sub-matrixes are able to be selected, and during said representing step, the choice of the sub-matrix producing said sequence represents at least part of the information to be transmitted.

7. Information transmission method according to claim 6, wherein, during said conjoint selection step, the row of coefficients take at least two different values, and during said representing step, choice of the row of coefficients represents at least part of the information to be transmitted.

8. Information transmission method according to claim 7, wherein, during said conjoint selection step, binary coefficients are selected in order to form the row of coefficients.

9. Information transmission method according to claim 8, further comprising an amplitude modulation step during which modulated amplitude is proportional to elements of the sequence.

10. Information transmission method according to claim 9, wherein two items of information are transmitted, the method further comprising a quadrature amplitude modulation step during which each amplitude is proportional to elements of a sequence representing one of the items of information.

11. Method of receiving information by means of a transmission channel associated with a first numerical alphabet, each number in the first alphabet being proportional to a physical quantity to be transmitted on the channel, the method comprising:

receiving sequences of numbers;

conjointly determining a sub-matrix and a row of coefficients, wherein the sub-matrix is selected from a set of at least one sub-matrix of a matrix with an orthogonal dominant H of dimensions n×n on a second numerical alphabet including at least three different non-null values, wherein each of the at least one sub-matrix of the set contains a number p greater than or equal to 2 of rows of the matrix of H, and wherein the row of coefficients comprises a p-tuple of real numbers, wherein a matrix product of the row of coefficients and the determined sub-matrix supplies a sequence of numbers of the first alphabet, and wherein the determined sub-matrix and the row of coefficients conjointly represent the information to be transmitted; and conjointly matching the determined sub-matrix and the row of coefficients with the transmitted information.

12. Information reception method according to claim 11, wherein the matrix H is an orthogonal matrix and wherein, during said conjoint determination step, a sub-matrix of the orthogonal matrix H is determined.

13. Information reception method according to either one of claims 11 or 12, wherein, during said conjoint determination step, a sub-matrix of a matrix H is selected, for which diagonal elements of a matrix $H.H^T$ resulting from a matrix product of the matrix H and a transposed matrix $H^T$ of the matrix H, are all equal to a same value M.

14. Information reception method according to claim 13, wherein, during said conjoint determination, the coefficients of the row of coefficients all have a same absolute value.

15. Information reception method according to claim 14, wherein, during said conjoint selection step, the sub-matrix of the set of sub-matrixes, and the p-tuple of real numbers referred to as the row of coefficients are determined so that a matrix product of the row and the selected sub-matrix supplies a sequence of numbers of the first alphabet, a sum of whose squares is a predetermined value.

16. Information reception method according to claim 15, wherein, during said conjoint determination step, the sub-matrix is determined from amongst at least two sub-matrixes, and during said matching step, choice of the sub-matrix producing the sequence represents at least part of the information to be transmitted.

17. Information reception method according to claim 16, wherein, during said conjoint selection step, the row of coefficients take at least two different values, and during said matching step, choice of the value of the row of coefficients represents at least part of the information to be transmitted.

18. Information reception method according to claim 17, wherein said conjoint determination step further comprises a step of calculating scalar products during which there is effected a scalar product of the sequence with each row of the matrix H.

19. Information reception method according to claim 18, wherein said conjoint determination step further comprising:
determining coefficients respectively equal to signs of the p scalar products whose absolute value are highest, and
determining the sub-matrix including rows for which absolute values of the scalar products are highest.

20. Information reception method according to claim 19, further comprising detecting transmission error by comparing the rows of the matrix H determined during said conjoint determination step and groups of predetermined rows, an error being detected when the rows determined during said conjoint determination step do not correspond to any predetermined group of rows.

21. Information reception method according to claim 20, further comprising a step of detecting transmission errors by comparing the coefficients of the row of coefficients determined during said conjoint determination step and predetermined groups of coefficients, an error being detected when the coefficients determined during said conjoint determination step do not correspond to any predetermined group of coefficients.

22. Information reception method according to claim 21, wherein said conjoint determination step includes a step of comparing the received sequence with predetermined sub-matrixes of the matrix H.

23. Information reception method according to claim 22, further comprising a step of demodulating signals modulated by amplitude modulation.

24. Information reception method according to claim 22, further comprising a step of demodulating signals modulated by quadarature amplitude modulation, during which each amplitude independently supplies a sequence of numbers representing information.

25. Device for transmitting information on a transmission channel associated with a first numerical alphabet, each number in the first alphabet being proportional to a physical quantity to be transmitted on the channel, comprising:
a memory adapted to store a set of at least one sub-matrix of a matrix with an orthogonal dominant H of dimensions n×n on a second numerical alphabet including at least three different non-null values, each sub-matrix of the set containing a number p greater than or equal to 2 rows of the matrix H,
a means of conjoint selection of:
one of the sub-matrixes of the set, and
a row of p coefficients equal to +1 or −1,
wherein a matrix product of the row and the selected sub-matrix supplies a sequence of numbers of the first alphabet, the selected sub-matrix and the selected row of coefficients conjointly representing the information to be transmitted, and
a means of representing the information to be transmitted by the sequence.

26. Information transmission device according to claim 25, wherein the matrix H is an orthogonal matrix, and wherein said memory is adapted to store sub-matrixes of the orthogonal matrix H.

27. Information transmission device according to either one of claims 25 or 26, said memory is adapted to store sub-matrixes of a matrix H, for which diagonal elements of a matrix $H.H^T$ resulting from a matrix product of the matrix H and the transposed matrix $H^T$ of the matrix H, are all equal to a same value M.

28. Information transmission device according to claim 27, wherein said conjoint selection means is adapted to select coefficients of the row of coefficients all having a same absolute value.

29. Information transmission device according to claim 28, said conjoint selection means is adapted to select the sub-matrix of the set, and the p-tuple of real numbers referred to as the row of coefficients so that a matrix product of the row and the selected sub-matrix supplies a sequence of numbers of the first alphabet, a sum of whose squares is a predetermined value.

30. Information transmission device according to claim 29, wherein said memory is adapted to store at least two sub-matrixes, and said representative means is adapted so that choice of the sub-matrix producing said sequence represents at least part of the information to be transmitted.

31. Information transmission device according to claim 30, wherein said conjoint selection means is adapted to select a value of the row of coefficients from amongst at least two different values, and said representation means is adapted so that choice of the value of the row of coefficients represents at least part of the information to be transmitted.

32. Information transmission device according to claim 31, wherein said conjoint selection means is adapted to select binary coefficients in order to form the row of coefficients.

33. Information transmission device according to claim 32, further comprising an amplitude modulator adapted to modulate amplitude proportionally to elements of the sequence.

34. Information transmission method according to claim 33, further comprising a quadrature amplitude modulator adapted so that each of quadrature amplitudes is proportional to elements of said sequence.

35. Device for receiving information by means of a transmission channel associated with a first numerical alphabet, each number in the first alphabet being proportional to a physical quantity to be transmitted on a channel, the device comprising:

at least one means of receiving sequences of numbers;

a memory (205) adapted to store a set of at least one sub-matrix of a matrix with an orthogonal dominant H of dimensions n×n on a second numerical alphabet including at least three different non-null values, each sub-matrix of the set containing a number p greater than or equal to 2 of rows of the matrix H; a means of conjoint determination of:

one of the sub-matrixes of said set, and a p-tuple of real numbers referred to as the row of coefficients, wherein a matrix product of the row and the selected sub-matrix corresponding to the received sequence, the selected sub-matrix and the row of coefficients selected conjointly representing information to be transmitted; and a means of joint matching of the sub-matrix and the row of coefficients with transmitted information.

36. Information reception device according to claim 35, wherein the matrix H is orthogonal and said memory is adapted to store sub-matrixes of the orthogonal matrix H.

37. Information reception device according to either one of claims 35 or 36, wherein said memory is adapted to store sub-matrixes of a matrix H for which diagonal elements of a matrix $H.H^T$ resulting from a matrix product of the matrix H and a transposed matrix $H^T$ of the matrix H, are all equal to a same value M.

38. Information reception device according to claim 37, said conjoint selection means is adapted so that coefficients of the row of coefficients all have a same absolute value.

39. Information reception device according to claim 38, wherein said conjoint selection means is adapted to select the sub-matrix of the set, and the p-tuple of real numbers referred to as the row of coefficients so that a matrix product of the row and the selected sub-matrix supplies a sequence of numbers of the first alphabet, a sum of whose squares is a predetermined value.

40. Information reception device according to claim 39, wherein said memory is adapted to store at least two sub-matries, and said matching means is adapted so that a choice of the sub-matrix producing the sequence represents at least part of the information to be transmitted.

41. Information reception device according to claim 40, wherein said conjoint determination means is adapted so that the row of coefficients take at least two different values, and said matching means is adapted so that a choice of value of the row of coefficients represents at least part of the information to be transmitted.

42. Information reception device according to claim 41, wherein said conjoint determination means sequence with each row of said matrix H.

43. Information reception device according to claim 42, wherein said conjoint determination means is adapted to determine that:

the coefficients are respectively equal to signs of p scalar products whose absolute value are highest, and the sub-matrix is one which includes the rows of the matrix H for which the absolute values of the scalar products are highest.

44. Information reception device according to claim 43, further comprising a transmission error detection means adapted to compare rows of the matrix H determined by said conjoint determination means and groups of predetermined rows, and to detect an error when the determined rows do not correspond to any predetermined group of rows.

45. Information reception device according to claim 44, further comprising a transmission error detection means adapted to compare coefficients of the row of coefficients determined by said conjoint determination means and predetermined rows of coefficients, and to detect an error when the determined coefficients do not correspond to any predetermined row of coefficients.

46. Information reception device according to claim 45, wherein said the conjoint determination means is adapted to compare the received sequence with predetermined sub-matrixes of the matrix H.

47. Information reception device according to claim 46, further comprising a demodulator for signals modulated by amplitude modulation.

48. Information reception device according to claim 46, further comprising a demodulator for quadrature amplitude modulation signals adapted to independently supply a sequence of numbers representing information.

49. Camera comprising a device according to claims 25, 26, 35 or 36.

50. Facsimile machine comprising a device according to any one of claims 25, 26, 35 or 36.

51. Photographic apparatus comprising a device according to claims 25, 26, 35 or 36.

52. Computer comprising a device according to claims 25, 26, 35 or 36.

53. Means for storing information which can be read by a computer or a microprocessor storing instructions of a computer program that enable the method according to claims 1, 2, 11 or 12.

54. Means for storing information according to claim 53, wherein said means is partially or totally removable.

55. Computer program containing instructions such that, when said program controls a programmable data processing device, said instructions result in said data processing device implementing a method according to any one of claims 1, 2, 11 or 12.

* * * * *

UNITED STATES PATENT AND TRADEMARK OFFICE
CERTIFICATE OF CORRECTION

PATENT NO. : 6,560,291 B1
DATED : May 6, 2003
INVENTOR(S) : Piret et al.

It is certified that error appears in the above-identified patent and that said Letters Patent is hereby corrected as shown below:

<u>Column 1,</u>
Line 29, "$a^2.T: E(a) = \lambda a^2.T.,$" should read -- $a^2.T: E(a) = \lambda.a^2.T.,$ --.

<u>Column 2,</u>
Line 3, "width. in" should read -- width. In --.
Line 4, "make" should read -- made --.
Line 66, "$V_i,$" should read -- $V_i$ --.

<u>Column 3,</u>
Line 46, "includes" should read -- includes: --.

<u>Column 5,</u>
Line 38, "on" should read -- in --.

<u>Column 8,</u>
Line 29, "$I_4$" should read -- $I_4,$ --.
Line 47, "$I_8$" should read -- $I_8,$ is --.
Line 63, "published" should read -- published by --.

<u>Column 9,</u>
Line 65, "of a consists" should read -- of <u>a</u> consists --.

<u>Column 10,</u>
Line 45, "<u>$H_8$</u>" should read -- <u>$H_3$</u> --.

<u>Column 11,</u>
Line 47, "<u>s</u>having" should read -- <u>s</u> having --.
Line 53, "âof" should read -- â of --.

<u>Column 12,</u>
Line 7, "addition" should read -- additional --.
Line 29, "$\{,H_1,$" should read -- $\{H_1,$ --.

UNITED STATES PATENT AND TRADEMARK OFFICE
CERTIFICATE OF CORRECTION

PATENT NO. : 6,560,291 B1
DATED : May 6, 2003
INVENTOR(S) : Piret et al.

It is certified that error appears in the above-identified patent and that said Letters Patent is hereby corrected as shown below:

Column 13,
Line 8, "contains" should read -- contains the --.
Line 9, "$\underline{I}$" should read -- $\underline{I}$, --.
Line 19, "and matrixes" should read -- and associated with matrixes --.
Line 28, "ohter" should -- other --.
Line 46, "$\underline{a}.\underline{H}$," should read -- $\underline{a}.\underline{H}_1$ --.

Column 14,
Line 7, "12    1    1    1" should read -- 12    1    -1    1 --.
Line 9, "11    1    -1    1" should read -- 11    1    -1    -1 --.
Lines 40 and 42, "a" should read -- $\underline{a}$ --.

Column 16,
Line 6, "1" should read -- I --.
Line 63, insert -- 1    1    1    1    1    1    9    11    12 --.

Column 17,
Line 61, ""data"" should read -- "data"of --.

Column 23,
Line 47, "sub-matries" should read -- sub-matrixes --.

Signed and Sealed this

Sixteenth Day of December, 2003

JAMES E. ROGAN
*Director of the United States Patent and Trademark Office*